(12) United States Patent
Kokajko

(10) Patent No.: US 12,034,784 B1
(45) Date of Patent: Jul. 9, 2024

(54) AUTOMATIC DETECTION OF COMPANION MODE FOR HYBRID EVENTS

(71) Applicant: Zoom Video Communications, Inc., San Jose, CA (US)

(72) Inventor: Samuel Kokajko, Round Rock, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/112,278

(22) Filed: Feb. 21, 2023

(51) Int. Cl.
*H04L 65/403* (2022.01)
*H04L 65/1069* (2022.01)

(52) U.S. Cl.
CPC ........ *H04L 65/403* (2013.01); *H04L 65/1069* (2013.01)

(58) Field of Classification Search
CPC .......................... H04L 65/403; H04L 65/1069
USPC ......................................................... 709/204
See application file for complete search history.

(56) References Cited

U.S. PATENT DOCUMENTS

| | | | | |
|---|---|---|---|---|
| 2009/0210802 | A1* | 8/2009 | Hawkins ............... | G06F 3/0481 709/204 |
| 2010/0287242 | A1* | 11/2010 | Kumar .................. | G06Q 10/10 709/204 |
| 2015/0117626 | A1* | 4/2015 | Nord ..................... | H04M 3/568 379/202.01 |
| 2015/0156598 | A1* | 6/2015 | Sun ...................... | H04L 12/1822 348/14.07 |
| 2021/0136230 | A1* | 5/2021 | Li ........................... | G10L 25/48 |
| 2021/0156700 | A1* | 5/2021 | Davis ..................... | G10L 17/06 |
| 2021/0385593 | A1* | 12/2021 | Sherman ................. | H04R 3/00 |

* cited by examiner

*Primary Examiner* — Zi Ye
(74) *Attorney, Agent, or Firm* — Kilpatrick Townsend & Stockton LLP

(57) ABSTRACT

Example methods and systems provide automatic detection of companion mode for a virtual conference application in hybrid events. A client device joins a virtual event session via the virtual conference application provided by a virtual conference provider. During the virtual event session, the virtual conference application receives a first audio signal from an audio source at an on-site event and a second audio signal from the virtual conference provider. The virtual conference application determines a correspondence between the first audio signal and the second audio signal during the virtual event session. The second audio signal is muted in response to determining the correspondence.

19 Claims, 10 Drawing Sheets

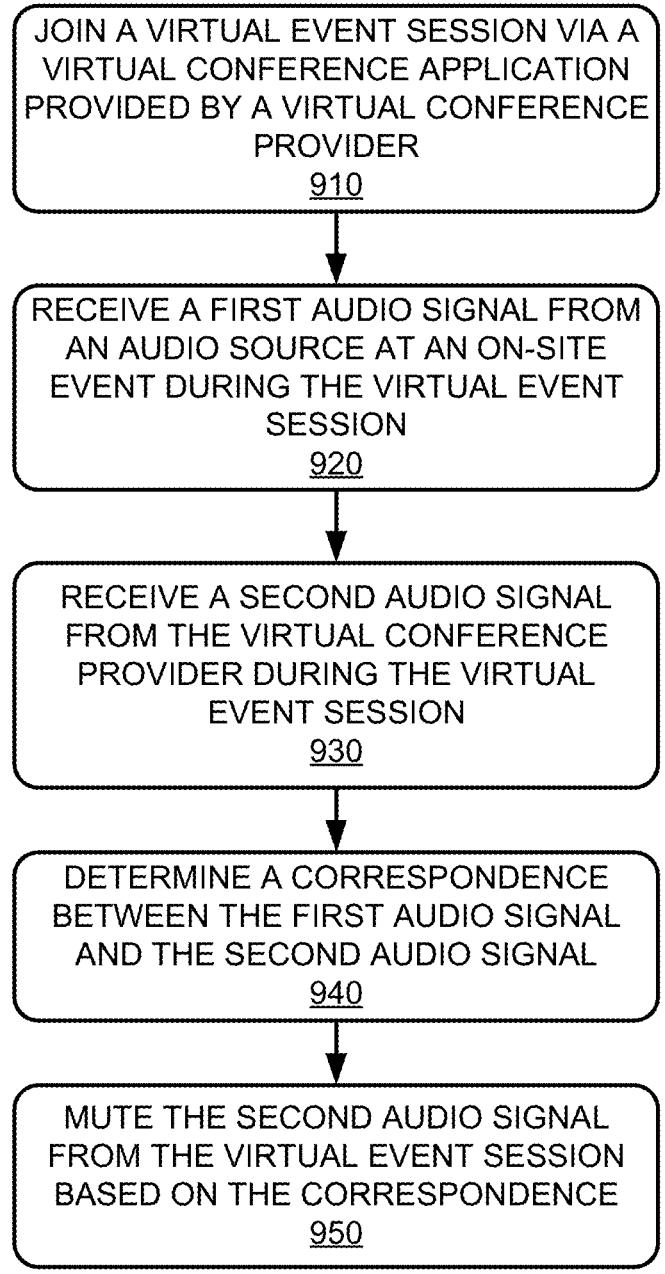

AUTOMATIC DETECTION OF COMPANION MODE FOR HYBRID EVENTS

FIELD

The present application generally relates to virtual conferencing and more specifically relates to automatic detection of companion mode for hybrid events.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 9 shows an example method for automatically detecting companion mode of a virtual conference application.

DETAILED DESCRIPTION

Figure 1:
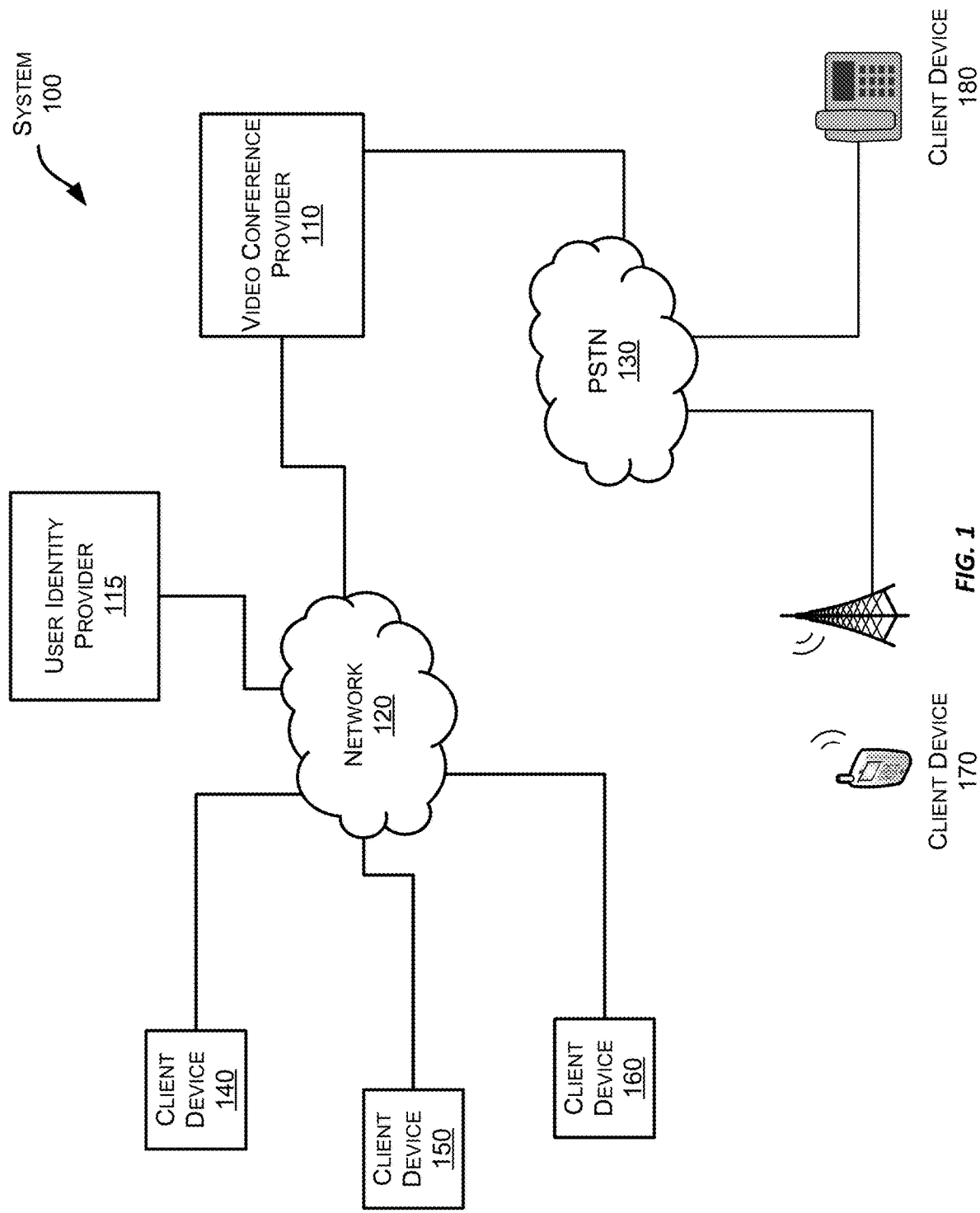
FIG. 1 shows an example system that provides videoconferencing functionality to various client devices.

Examples are described herein in the context of automatic detection of companion mode for hybrid events. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

An on-site event, such as a conference, an exposition, or a trade show, may host many different sessions over the course of one or more days, and at any given time, multiple different sessions may be on-going. These different sessions can provide virtual access in addition to on-site attendance. Such sessions are called hybrid sessions. Usually, a participant attending a session on-site cannot join the virtual session as well because it can cause issues with the user experience. For example, when an on-site participant tries to join the virtual session, it can cause audio feedback to the virtual session, or it can affect the virtual participant's ability to clearly hear the audio. In addition, it can also overload network bandwidth with redundant delivery of audio or video streams to on-site participants.

To provide high-quality audio and video for virtual participants and preserve interactive features for on-site participants, a virtual conference application installed on a client device can automatically detect if a participant joining the virtual session is attending the corresponding on-site session. If the participant is in the on-site session, the client-side application can automatically turn off the audio and video streaming on the client device and switch to a companion mode. In the companion mode, the participant can still access other features of the virtual session, such as chats, polls, closed captions, interpretation, and assistive listening for hearing-impaired attendees.

For example, a participant is at an on-site event. When the participant launches a virtual conference application provided by a video conference provider, the virtual conference application can suggest one or more virtual sessions for the participant to join based on the registration information or the location information. The on-site participant can select one virtual session to join.

Once the participant joins the virtual session, the virtual conference application receives audio streams from the virtual session and outputs them to the user. Meanwhile, the virtual conference application also receives audio signals from the on-site event via a microphone on the client device. The virtual conference application can determine a correspondence between the audio data from these two channels. In other words, the virtual conference application can determine if the virtual session corresponds to the on-site event.

In some examples, the virtual conference application can extract a particular audio signature in the audio signals from the microphone. The particular audio signature can be a particular audio pattern, including identifiable peaks and valleys within a time range. The virtual conference application also analyzes the audio signals from the virtual session to determine if the particular audio signature is detected within a predetermined time offset (e.g., 0.5 seconds) from the audio signals captured by the microphone. If the particular audio signature is detected in the audio signals from the virtual session within the predetermined time offset, the virtual conference application determines the correspondence between the audio signals from the two channels, and thus concludes that the virtual session corresponds to the on-site event. The virtual conference application then automatically deactivates the audio and video streaming and switches to companion mode. In the companion mode, other features for the virtual session are still active, such as polls, chats, closed captions, interpretation. The participant can select to switch back to the full virtual mode where the audio and video streams are reactivated.

In some examples, to determine a correspondence between the virtual session and the on-site event, the virtual conference application adds a timestamp at a specific time in the audio signal captured from the microphone from the on-site event and transmits the timestamped audio signal to the video conference provider. The video conference provider can compare the timestamped audio signal to the audio signal from the virtual session around the specific time to determine if the two audio signals correspond to each other.

Thus, this example enables an on-site participant to join the virtual session corresponding to the on-site event in companion mode. Running in companion mode for on-site participants improves audio quality for both the on-site participants and the virtual participants. In addition, it improves network performance by turning off the audio and video streaming from the virtual session for on-site participants. Meanwhile, on-site participants can still access interactive features provided by the virtual conference application, which are otherwise only available to virtual participants in the virtual session.

This illustrative example is given to introduce the reader to the general subject matter discussed herein and the disclosure is not limited to this example. The following sections describe various additional non-limiting examples and examples of automatic detection of companion mode for hybrid events.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
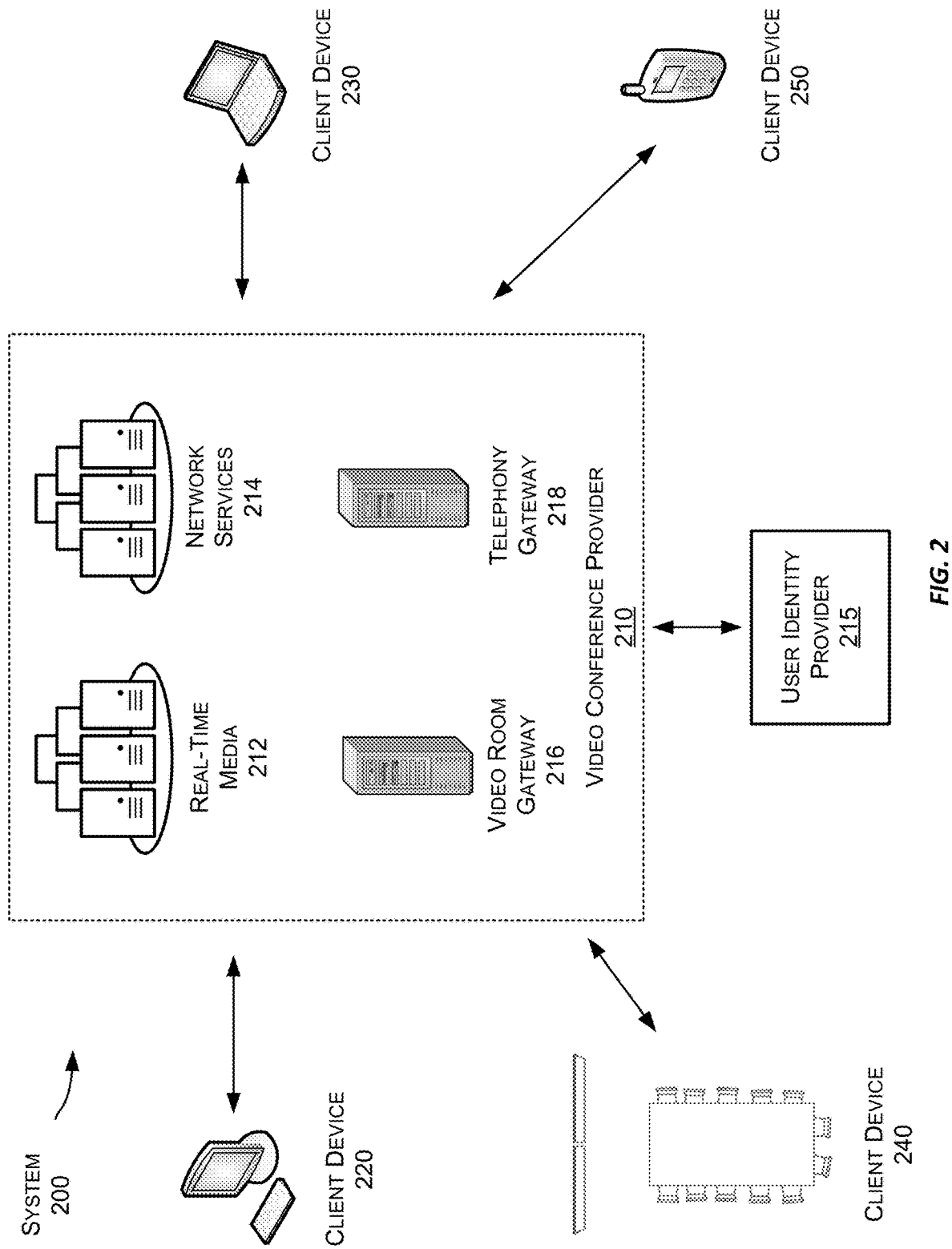
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network.

Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials.

Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
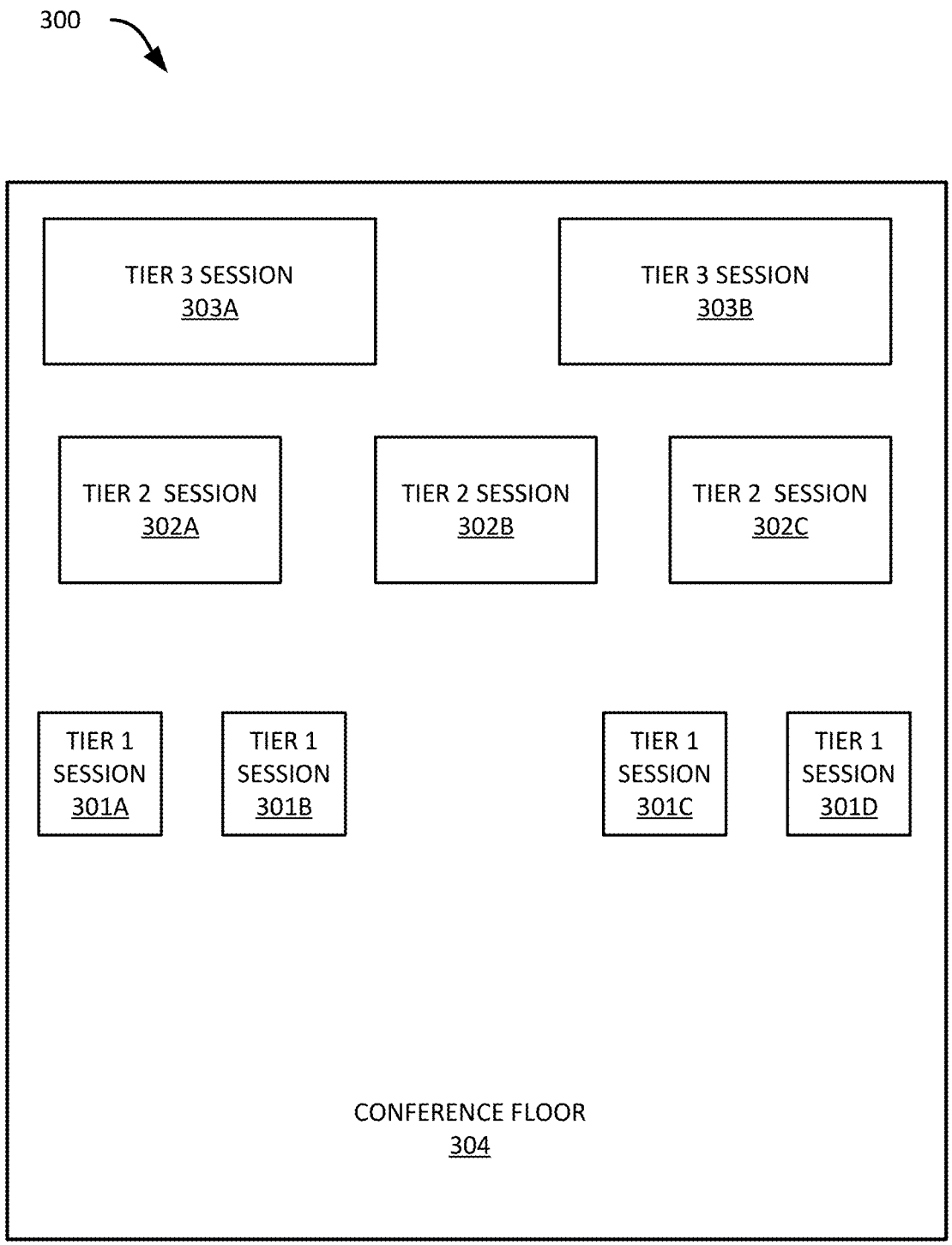
FIG. 3 shows an example conference including different sessions.

Now referring to FIG. 3, FIG. 3 illustrates an example conference 300 including different sessions. The different sessions, such as 301A-301D, 302A-302C, and 302A-302B, can be scheduled at the same time or at different times. The different sessions may be on one or more conference floors, which is collectively referred to as conference floor 304. The sessions at the conference 300 may have different tiers. Each session may be assigned a tier based on criteria such as registration requirements. The tiers of sessions may vary by degree of visibility and accessibility by participants. For example, tier 3 sessions, such as 303A and 303B, only need general registration for the conference. Tier 2 sessions, such as 302A, 302B, and 302C, need additional registration on top of the general registration. Tier 1 sessions, such as 301A, 302B, 302C, and 302D, are private events only open for specific participants. The one or more tiers of sessions at the conference 300 may be referred to collectively as "sessions." A participant with general registration can access the conference floor 304 and have permission to attend the tier 3 sessions 303A and 303B. To attend tier 2 events, such as 302A, 302B, 302C, a participant needs additional registration besides a general registration. To attend tier 3 events, such as 301A-301D, a participant needs to prove identification or invitation.

The conference 300 provides virtual access for some or all of the on-site sessions. That is, for an on-site session, there may be a corresponding virtual session for virtual participation. The virtual version of the conference 300 can be launched in a virtual conference application provided by a video conference provider. The conference host may schedule the virtual sessions to start and end at the same time as the corresponding on-site sessions, allowing permitted virtual participants to attend at specific times.

In some embodiments, the conference host may arrange the virtual events on the virtual conference floor the way on-site sessions appear on the conference floor 304. In some embodiments, the conference host may also configure the virtual conference floor to a different layout. The virtual conference floor can show various sessions arranged by tier or by subject matter. The virtual conference floor may also include one or more backgrounds. For example, the virtual conference floor may include a background that represents a physical conference floor. The virtual conference floor may include different backgrounds in different regions. In some embodiments, the backgrounds in different regions may be associated with a subject matter. The virtual sessions may then be arranged into the regions by their respective subject matters, correlating to the associated subject matter of each region. In some embodiments, the subject matter of each virtual session may be entered into a database of other data structure by the conference host. A computing device, configured to read information from the database or other data structure may then cause the sessions to be organized by subject matter. Each session may be represented by a text, image, or logo. The text, image, or logo, and/or the complexity thereof, may be determined by the tier or subject matter of the respective session.

Figure 4:
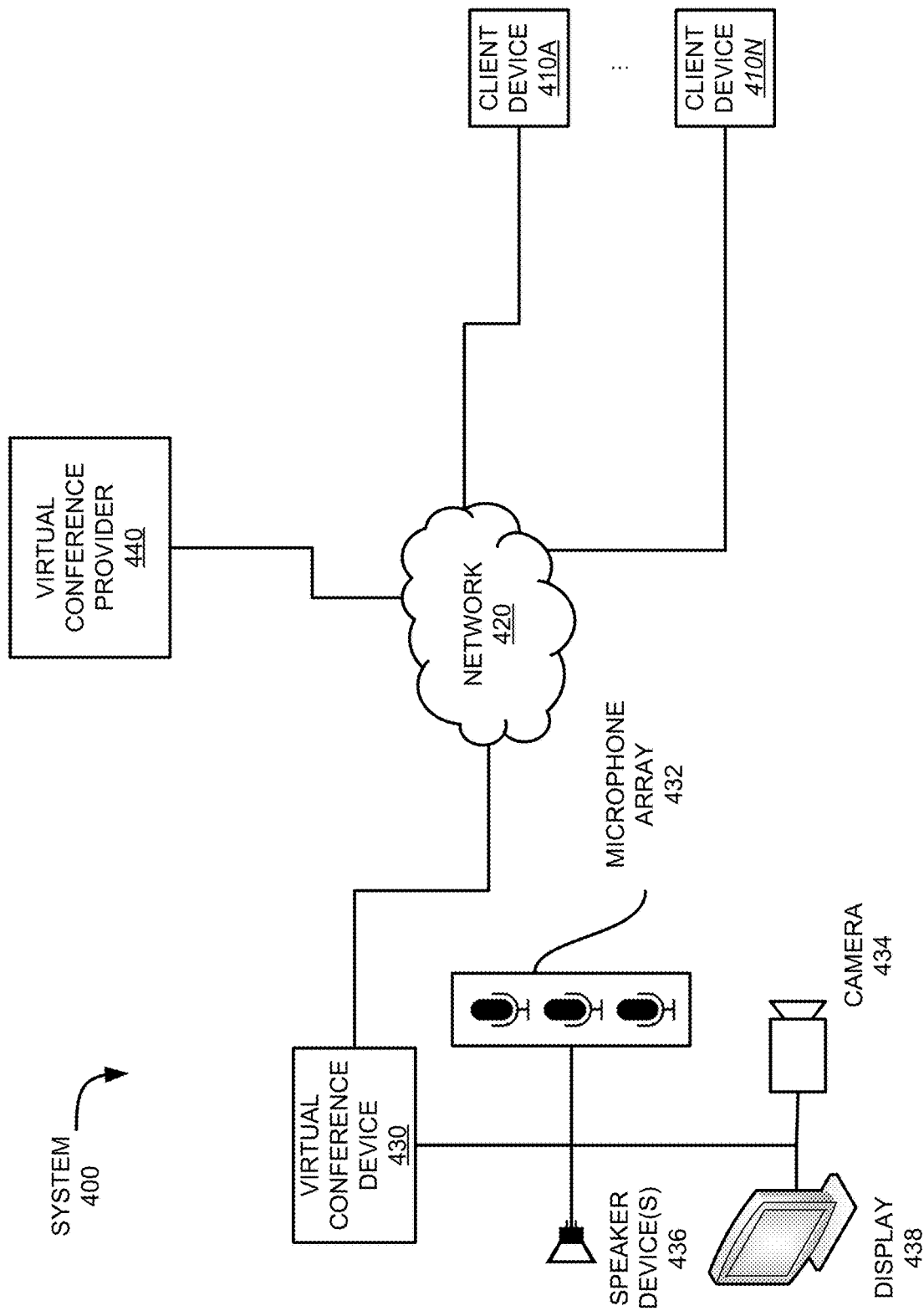
FIG. 4 shows an example system for creating a virtual session for a corresponding on-site event.

Referring now to FIG. 4, FIG. 4 shows an example system 400 for creating a virtual session for a corresponding on-site event. In this example system 400, a virtual conference device 430 and a number of client devices 410A-410N (which may be referred to herein individually as a client device 410 or collectively as the client devices 410) are connected to a virtual conference provider 440 via a network 420. In this example, the network 420 is the internet, however, any suitable communications network or combination of communications network may be employed, including LANs (e.g., within a corporate private LAN) and WANs, similar to the network 110 illustrated in FIG. 1. The virtual conference provider 440 can be the video conference provider 110 illustrated in FIG. 1 or video conference provider 210 illustrated in FIG. 2. The client devices 410 can be client devices 140-160 illustrated in FIG. 1 or client devices 220-250 illustrated in FIG. 2.

In this example, virtual conference device 430 provides video conferencing functionality to an on-site event in a common area, such as a conference room or event hall. The virtual conference device 430 in this example includes a computing device, a microphone array 432, camera(s) 434, one or more speaker devices 436, and display(s) 438 installed within the common area. While the virtual conference device 430 operates as a client device, its hardware components may be dispersed throughout the common area to enable virtual participants to hear on-site participants, such as a presenter, and enable on-site participants to hear virtual participants, such as questions asked by virtual participants.

The virtual conference device 430 has virtual conferencing software installed to enable it to connect to the virtual conference provider 440, to capture audio and video data using the microphone array 432 and camera(s) 434, and exchange audio and video streams with virtual participants via the virtual conference provider 440. While the virtual conference device 430 in some examples may include dedicated video conferencing equipment as discussed above, in other examples, it may be a conventional computing device, such as a desktop or laptop computer, or a handheld device such as a tablet or smartphone.

Similarly, each client device 410 executes a virtual conference application, which connects to the virtual conference provider 440, to join the virtual session hosted by the virtual conference device 430. During the virtual session, the various virtual participants, via their respective client devices, are able to interact with each other and with on-site participants by viewing video streams and hearing audio streams from other participants, and by capturing and transmitting video and audio of themselves. On-site participants may also join the virtual session via their respective client devices. The virtual conference application may automatically switch to companion mode in which the video and audio streams are deactivated but other features are still available for on-site participants.

Figure 5:
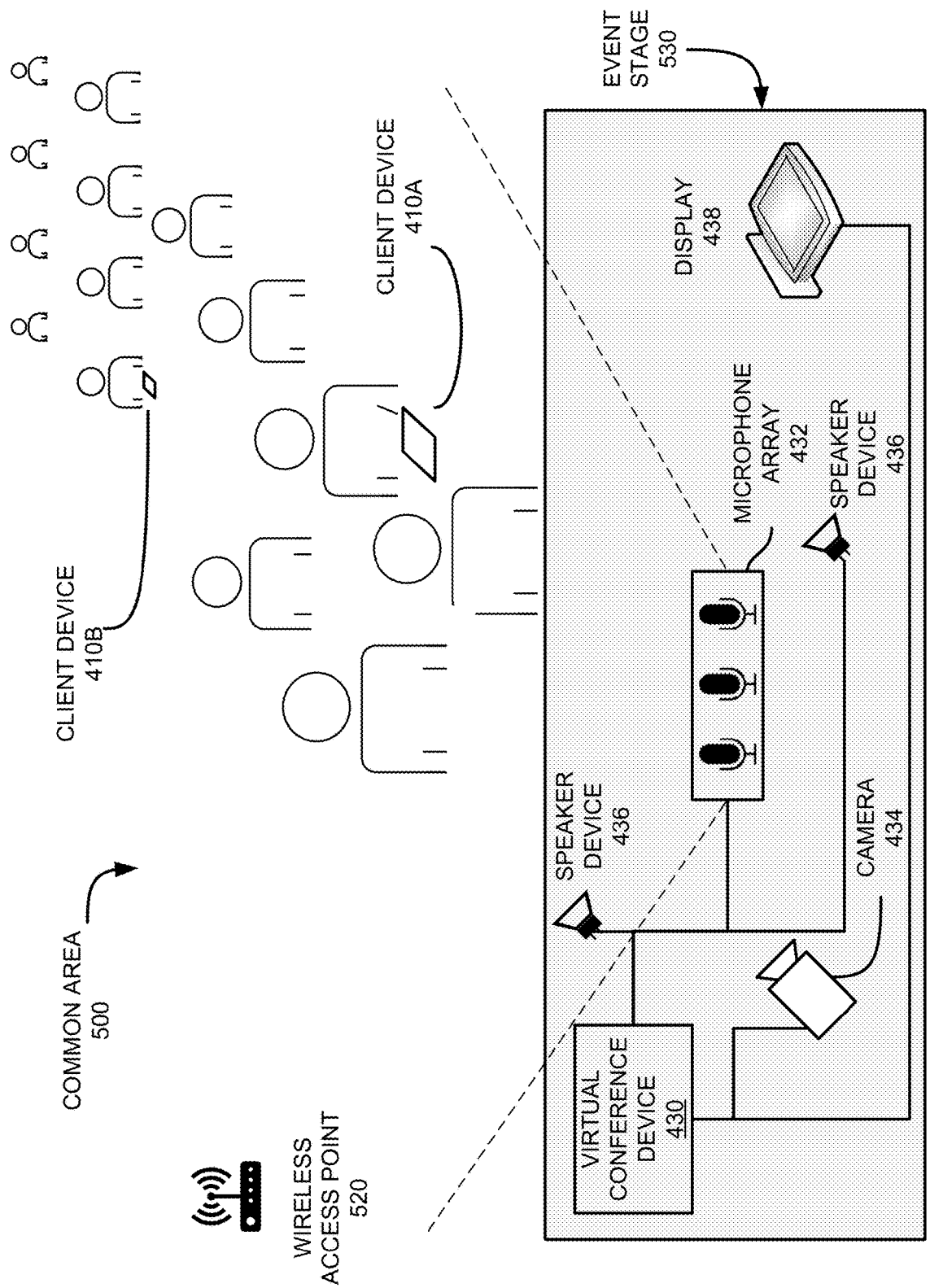
FIG. 5 illustrates an example common area in which multiple people are attending an on-site event.

Referring now to FIG. 5, FIG. 5 shows an example common area 500, such as a conference room or event hall, in which multiple people are attending an on-site event. The conference room includes an event stage 530 for the one-site event. On the event stage, there may be one or more hosts speaking. A virtual conference device 430 is also installed on the event stage for providing a corresponding virtual session for virtual participation. The virtual conference device 430 connects to the virtual conference provider 440 using the network interface, which may be a wired interface, such as an Ethernet interface, or a wireless interface, such as a Wi-Fi interface.

On-site participants in the common area 500 can interact with the virtual participants in the virtual session using the camera 434 and microphone array 432 and can see and hear the virtual participants via the display 438 and speaker devices 436. In addition, on-site participants can also connect to the virtual session via client devices 410. For example, two on-site participants in the common area 500 are using client devices 410A and 410B, which may be connected to a wireless network via the available wireless access point 520. As discussed above with respect to FIG. 4, the client devices 410A and 410B may be any suitable client device, such as a smartphone, tablet computer, or laptop computer. During the virtual conference, the user of client device 410A elects to join the virtual session while in the common area 500.

The client device 410A can receive audio signals from speaker device 436 on the event stage 530 and also receive audio signals from the virtual session. A virtual conference application installed on the client device can compare the audio signals from the speaker device 436 and the audio signals from the virtual session to determine a correspondence between the audio signals from the two different channels. If the audio signals from the speaker device 436 correspond to the audio signals from the virtual session, the virtual conference application can automatically mute the audio signals from the virtual session and switch to companion mode. The video streaming is also turned off. The companion mode still includes other features available in the full virtual mode, such as polls, chats, closed captions, and interpretation, for on-site participants to use.

Figure 6:
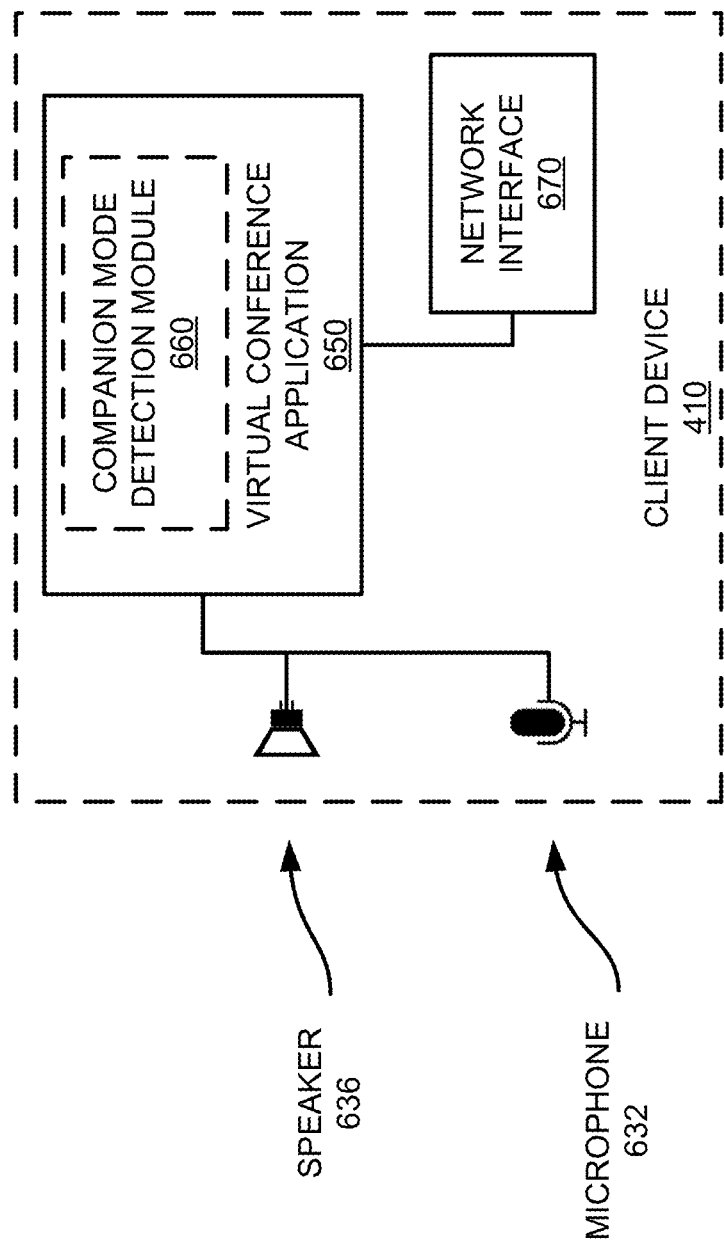
FIG. 6 an example client device that is configured to join a virtual session.

Referring now to FIG. 6, FIG. 6 shows an example client device 410 that is configured to join a virtual session. The client device 410 executes a virtual conference application 650 to join the virtual session. In this example, the client device includes an internal microphone 632 and speaker 636, though other examples may employ external microphones or speakers.

The client device's microphone 632 can capture audio signals in the common area 500 and transmit them to the virtual conference application 650. Meanwhile, the virtual conference application 650 also receive audio signals from the virtual session, launched by the virtual conference device 430, using the network interface 670. The virtual conference application 650 includes a companion mode detection module 660. The companion mode detection module 660 is configured to automatically determine if the virtual conference application 650 needs to switch to companion mode by comparing the audio signals from the virtual session and the audio signals from the common area 500. The audio signals captured by the client device's microphone 632 include substantially the audio signals from an audio source for the on-site event, such as a speaking participant, an amplifier of the speaking participant, or the speaker device 436. However, there may also be noise signals from the common area, such as ambient sounds from the event space, echoes of the presenter's audio, etc. The companion mode detection module 660 can extract audio signatures from the on-site audio signals and audio signals from the virtual session for comparison. In some examples, the companion mode detection module 660 may access frequency information of the two types of audio signals by implementing a Fast Fourier Transformation (FFT) algorithm. The companion mode detection module 660 identifies certain unique peaks, valleys, or other characteristics, which together can be considered as a particular audio pattern or audio signature, in the audio signals from common area at the on-site event at a particular time point. Similarly, the companion mode detection module 660 analyzes the audio signals from the virtual session to detect an audio pattern substantially the same as the particular audio pattern in the audio signals from the common area at the on-site event. If such an audio pattern is detected within a predetermined time offset (e.g., 0.5 seconds) from the particular time point, the companion mode detection module 660 can determine a correspondence between the audio signals from the common area 500 and the audio signals from the virtual session. Thus, the companion mode detection module 660 determines the virtual session that the participant just joined corresponds to the on-site event that participant is attending. The virtual conference application 650 then turns off the audio and video streams and switches to companion mode.

In the example above the client device 410 determines the virtual session corresponds to the on-site event by comparing audio signals from the virtual session and the audio signals from the common area at the on-site event. Alternatively, or additionally, the client device 410 can determine if a virtual session joined by a participant corresponds to an on-site event the participant is attending on-site by using other information, such as registration and location information, alone or in combination with each other.

For example, the companion mode detection module 660 receives location information of the client device 410. The location information can be collected by a Global Positioning System (GPS) module in the client device or using Wi-Fi location techniques. Alternatively, or additionally, event locations, such as a conference room, are equipped with micro-location technologies, such as near-field communication ("NFC") and Bluetooth. For example, a beacon installed in a conference room can transmit a beacon signal to the virtual conference application 650 installed on the client devices 410 when the client devices are in the conference room. The beacon signal includes the information about the on-site event that the client device is attending. Meanwhile, the virtual conference application 650 collects information about the virtual session, including location information of the corresponding on-site event. The companion mode detection module 660 of the virtual conference application 650 can compare information in the beacon signal and the information about the virtual session to determine if a participant is at an on-site event corresponding to the virtual session the participant is attending. If the on-site event corresponds to the virtual session, the virtual conference application automatically turns off the audio and video streams from the virtual session and switches to companion mode for the participant.

Similarly, a participant could scan, via a user device, an NFC tag, a RFID tag, a QR code, or any suitable symbol contained within a placard or other display to obtain information about the on-site event when the participant enters the event space. The information about the on-site event can be a verification that the participant is at the on-site event and the information is transmitted to the virtual conference application 650. Meanwhile, the virtual conference application 650 obtains information about the virtual session the participant joins, such as the information for its corresponding on-site event. The companion mode detection module 660 of the virtual conference application 650 compares the information obtained from scanning and the information obtained about the virtual session to determine if the on-site event the participant is attending corresponds to the virtual session the participant is attending. If the on-site event corresponds to the virtual session, the virtual conference application automatically turns off the audio and video streams from the virtual session and switches to companion mode for the participant.

As another example, an on-site event requires a participant to present a code, such as quick response ("QR") code or bar code, the participant obtained from registration to sign in before going into the on-site event. The collected sign-in information, including identity information of the on-site participants or the invitation information for the on-site event, is transmitted to the video conference device 430 hosting a virtual session for the on-site event or another specialized hardware provided by the virtual conference provider 440 at the on-site event. When a client device joins a virtual session hosted by the video conference device 430, the virtual conference application 650 on the client device 410 receives the sign-in information for the corresponding on-site event. Meanwhile, the virtual conference application 650 obtains identity information of the virtual participant. The companion mode detection module 660 compares the identity information of the virtual participant to the sign-in information for the on-site event. If the identity information of the virtual participant appears in the sign-in information for the on-site event, the companion mode detection module 660 concludes that the participant joining the virtual session is at the corresponding on-site event. The virtual conference application 650 then turns off the audio and video streams, and switches to companion mode.

While the correspondence between the virtual event and the on-site event can be determined at the client device by the virtual conference application 650, it can also be determined by the virtual conference provider 440. For example, the virtual conference application 650 adds a timestamp at a specific time point in the audio signal captured by the microphone 632 from the common area at an on-site event and transmits the timestamped audio signal to the virtual conference provider 440. The virtual conference provider 440 compares the timestamped audio signal to the audio signal from the virtual session around the specific time point to determine if the two audio signals correspond to each other, thus, determining if the virtual session corresponds to the on-site event. Also as an example, the virtual conference application 650 can transmit the location information of the client device 410 to the virtual conference provider 440. The virtual conference provider 440 also obtains information about the virtual session when the client device 410 joins the virtual session. The information about the virtual session can include location information of the corresponding on-site event. If the location information of the client device 410 matches the location of the corresponding on-site event included in the information about the virtual session, the virtual conference provider 440 can conclude that the virtual session the participant is attending corresponds to the on-site event the participant is attending. Yet as another example, the virtual conference provider 440 collects registration information about on-site participants at an on-site event with a corresponding virtual session via specialized hardware on-site or the virtual conference application 650. Meanwhile, the virtual conference provider 440 can access information about the participant joining the virtual session. If the information about the participant who joined the virtual session is included in the registration information about on-site participants at the corresponding on-site event, the virtual conference provider 440 determines the participant who joined the virtual session is also at the corresponding on-site event.

Figure 7:
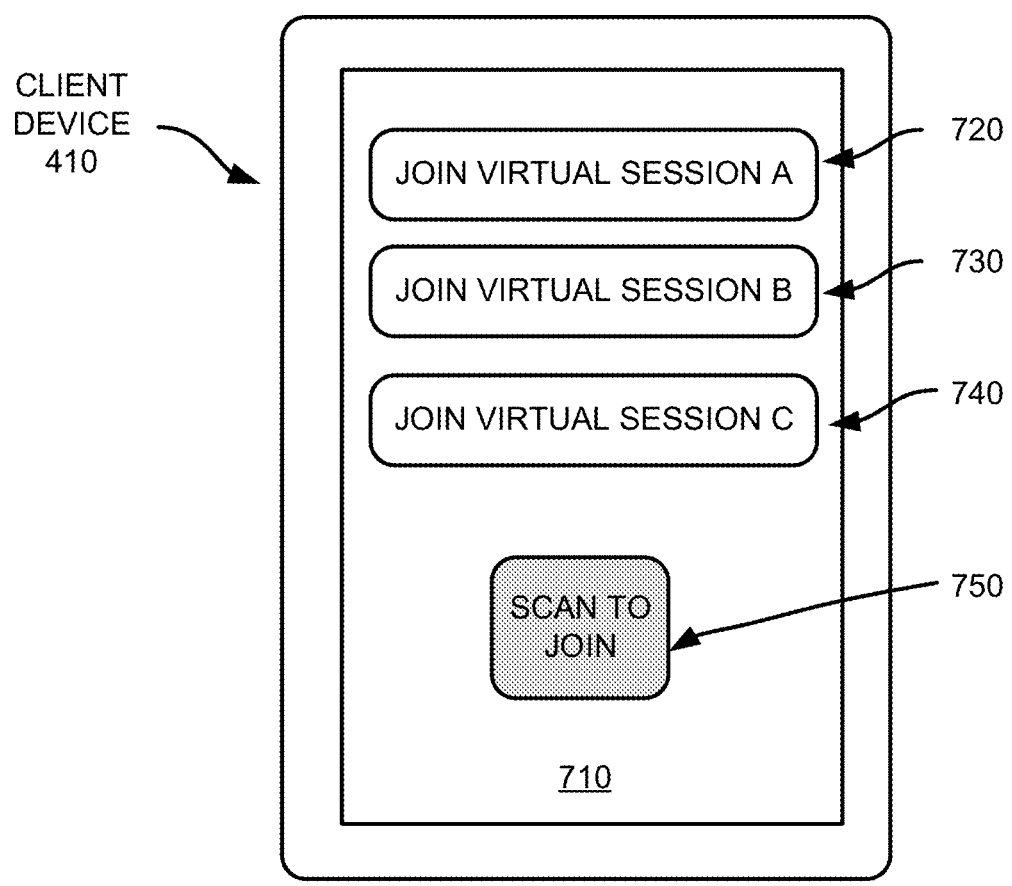
FIG. 7 shows a graphical user interface (GUI) displayed on the client device after a participant has executed a virtual conference application at an on-site event.

Referring now to FIG. 7, FIG. 7 shows a graphical user interface (GUI) 710 displayed on the client device 410 after a participant has executed virtual conference application 650 at an on-site event. In some examples, the on-site event is a conference having multiple sessions going on at the same time. When a registered participant logs in to the conference, the virtual conference application 650 suggests one or more virtual event sessions, such as 720, 730, and 740, for the user to join based on the location information. For example, the virtual conference application 650 can access to the location information of the client device 410 and prompt the virtual sessions on the GUI corresponding to on-site events near the location of the client device. As another example, the client device 410 can receive beacon signals near the location of the client device 410, the beacons including information about virtual sessions corresponding to on-site events nearby. The virtual conference application 650 then prompts the virtual sessions based on the beacon signals received. Alternatively, or additionally, the virtual conference application 650 can prompt one or more virtual sessions, such as 720, 730, and 740, for a participant to join based on the participant's registration information. For example, the user was only registered with general admission, which can only access to tier 3 events, then on-going tier 3 events nearby are prompted on the GUI 710 for the user to join. As another example, the participant also registered for special events, such as tier 2 events, in additional to the general registration, then on-going tier 2 events nearby are also prompted on the GUI 710 for the user to join. Besides suggesting virtual sessions to join, the GUI of the virtual conference application 650 also enables a participant to scan a token, such as QR code, bar code, or NFC tag, to join a virtual session. The token may be provided at an on-site event for participants to join the corresponding virtual session. Alternatively, or additionally, the token is provided to the participant when the participant registers for attending an event online.

After joining one virtual session, the companion mode detection module 660 in the virtual conference application 650 can determine if the virtual session corresponds to the on-site event which the participant is attending in person. The determination can be based on comparing audio signals, location information, or registration information. Based on the correspondence of the virtual session and the on-site event, the virtual conference application 650 can switch to companion mode automatically.

Figure 8B:
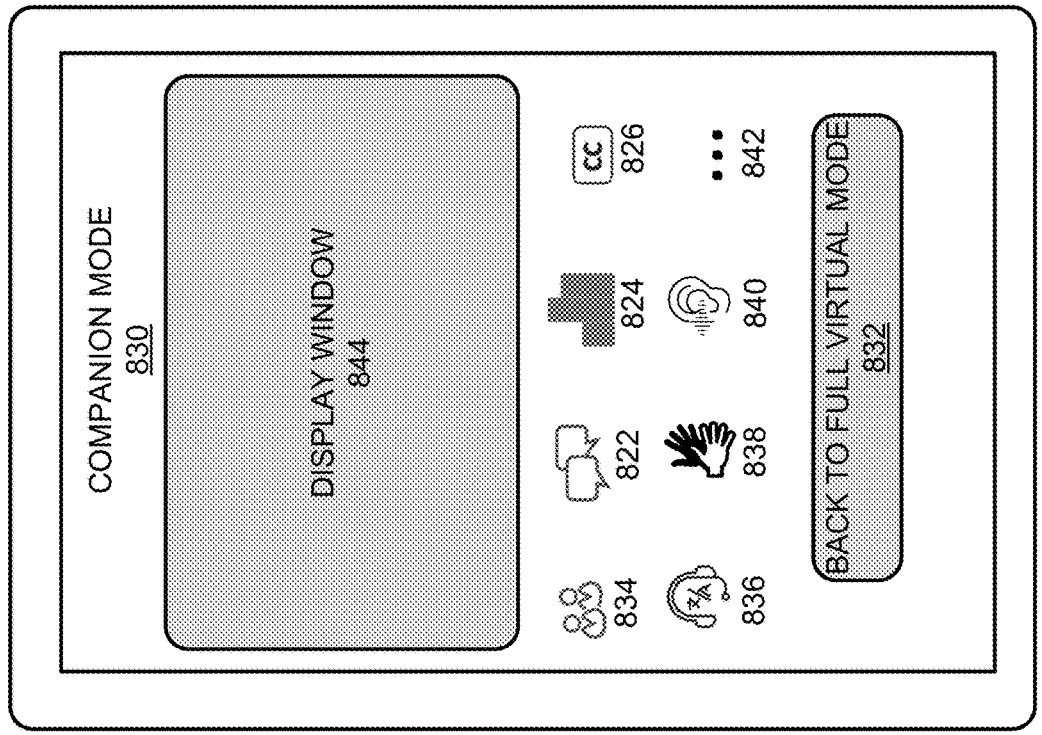
FIG. 8B shows a GUI of a companion mode for a virtual session displayed on a client device.
Figure 8A:
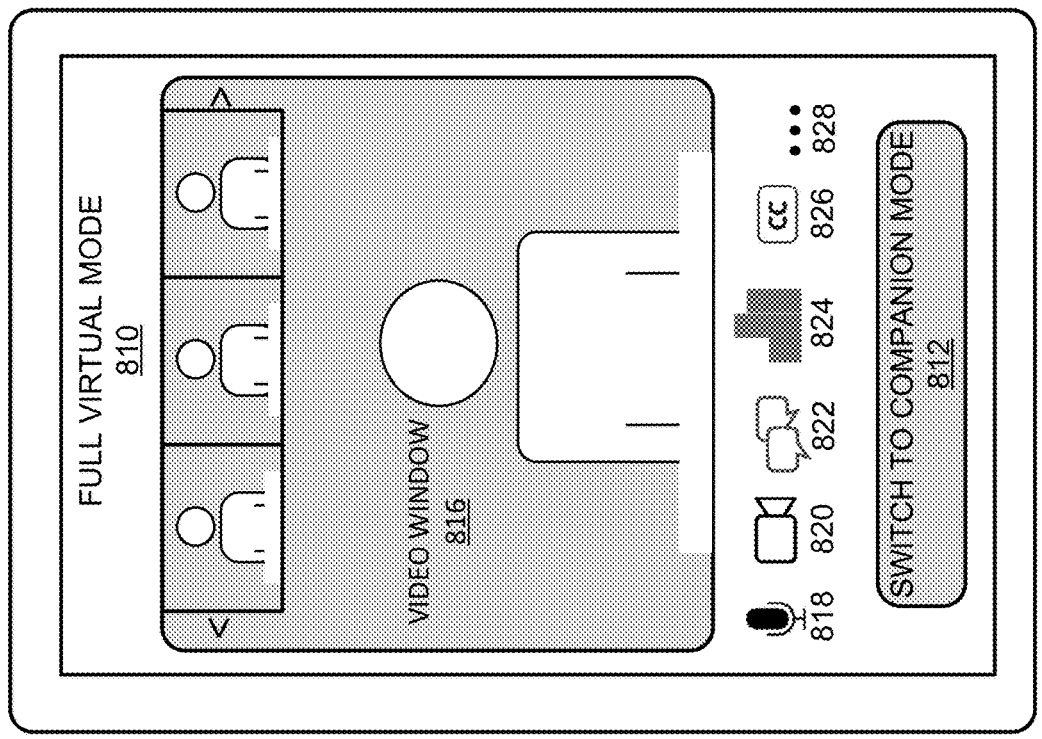
FIG. 8A shows a GUI of a full virtual mode for a virtual session displayed on a client device.

Referring now to FIG. 8A, FIG. 8A shows a GUI of a full virtual mode 810 for a virtual session displayed on a client device 410. The GUI of the full virtual mode 810 is similar to conventional GUIs for virtual conferences. For example, the GUI of the full virtual mode 810 includes a video window 816 to display a camera view of a participant that is current speaking or that is pinned to display. The video window 816 can also display camera views of other participants like in the conventional GUIs. Besides, the GUI of the full virtual mode 810 also includes an audio input button 818 which can be muted or unmuted; a video input button 820 which can be turned on or off; a chat or Q&A button 822; a poll button 824; a closed caption button 826; and more options 628 like in the conventional GUIs. However, unlike conventional GUIs which only have one mode, the GUI of the full virtual mode 810 in this disclosure also includes a button 812 for switching to companion mode. When the virtual conference application 650 is launched in full virtual mode for a virtual session, the participant can press or click the button 812 to switch to the companion mode.

Referring now to FIG. 8B, FIG. 8B shows a GUI of a companion mode 830 for a virtual session displayed on the client device 410. The GUI of the companion mode 830 does not include video streams and audio streams of the virtual session, because on-site participants can usually hear and see what happens at the on-site event directly from the common area 500 or hear and see virtual participants via a speaker device 436 and a display 438. Also, the GUI of the companion mode 830 does not include audio input button 818 or video input button 820 as in the full virtual mode, because the common area of the on-site event usually provides microphones 432 and camera 434 to capture the audio and image of the on-site participants. The companion mode is designed to provide some ancillary features, which are generally available for virtual participants, for on-site participants, such as participant list, chat or Q&A, polls, closed caption. Accordingly, the GUI of the companion mode 830 includes several buttons or icons for activating corresponding features, for example a participant list button 834, a chat or Q&A button 822, a poll button 824, and a closed caption button 826.

Besides, the companion mode also provides some ancillary video or audio, for interpretation, sign language, and assistive listening. For example, when the interpretation button 836 is activated, the companion mode of virtual conference application 650 can provide audio streams in a selected language. On-site interpreters are no longer needed this way. Alternatively, or additionally, a participant can select to view live transcript in the selected language. Also as an example, when the American Sign Language (ASL) button 838 is activated, the virtual conference application displays video streams for the sign language. Similar to the interpretation service, on-site sign translators are no longer needed. Yet as another example, when the assistive listening button 840 is activated, the virtual conference application then provides audio signals aligned in time with audio signals captured by a microphone on a client device and transmits to an assistive listening device paired to the client device. Other available services can be accessed from the more options button 842. The display window 844 can display relevant content for activated buttons. For example, the closed captions can be displayed in the display window 844 when the closed caption button 826 is activated. Also as an example, the ASL video can be displayed in the display window 844 when the ASL button 838 is activated. The display window 844 can be an embedded window, or a floating window.

The GUI of the companion mode 830 also includes a button 832 for the participant to go back to the full virtual mode. The virtual conference application 650 can automatically switch to companion mode upon determining a participant who joined a virtual session is at the corresponding on-site event. However, the user can override the function by pressing the button 832 to go back to the full virtual mode.

Referring now to FIG. 9, FIG. 9 shows an example method 900 for automatically detecting companion mode of a virtual conference application. The example method 900 will be discussed with respect to the system 400 shown in FIG. 4; however, any suitable system for automatic detection of companion mode for hybrid events may be used.

At block 910, a client device 410 joins a virtual event session via a virtual conference application 650 provided by a virtual conference provider 440. The client device 410 is installed with the virtual conference application 650. When the client device launches the virtual conference application 650, registration information may be required to join certain virtual event sessions. In some examples, a hybrid conference is hosted on site and also provides virtual access to some or all of its sessions. When a participant for the conference logs in the virtual conference, one or more virtual event sessions may be prompted to the participant via the GUI 710 of the virtual conference application. The one or more virtual event sessions may be suggested to the participant based on relevant information about the participant, such as location information and registration information. For example, the virtual conference application 650 determines the participant is at the west wing of the conference site based on the location information of the client device 410, then the virtual conference application 650 prompts virtual sessions for undergoing on-site sessions in the west wing to the participant. As for another example, once the participant logs in the conference via the virtual conference application 650, the virtual conference application 650 can retrieve the registration information of the participant, and prompt the virtual sessions that the participant has registered to attend. The participant selects to join one virtual session via the GUI 710.

At block 920, the client device 410 receives a first audio signal from an audio source at an on-site event during the virtual event session. In some examples, when the participant joins the virtual event session via the virtual conference application 650 installed on the client device 410, the microphone 632 on the client device 410 is activated to allow the participant to interact with the virtual event session. The microphone 532 can capture audio signals from the audio source at the on-site event during the virtual event session. In some examples, the on-site event is held in a common area 500, such as a conference room. The first audio signal can be transmitted from a speaker device 436 on the event stage 530 and received by the microphone 632 of the client device 410. The virtual conference application 650 installed on the client device 410 receives the first audio signal via the microphone 632.

At block 930, the client device 410 receives a second audio signal from the virtual conference provider 440 during the virtual event session. When the client device joins the virtual event session, the virtual conference application 650 receives the second audio signal from the virtual conference provider 440, generally as described above with respect to FIGS. 1-5.

At block 940, the client device 410 determines a correspondence between the first audio signal and the second audio signal, generally as described above with respect to FIG. 6. For example, the companion mode detection module 660 of the virtual conference application 650 extracts a particular audio signature from the first audio signal, and analyzes the second audio signal to determine if the particular audio signature can be detected in the second audio signal within a predetermine period of time, for example 0.5 seconds. Usually, the audio signal transmitted by the virtual conference provider to participants of a virtual session has a latency of about 0.5 seconds, depending on the quality of the network connection, processing latency at the virtual conference provider, and network traffic or congestion, compared to the audio signal at the audio source, such as a speaker device on an event stage. However, the latency can be significantly higher or lower, depending on the configuration of the internal network and the virtual conference provider. For example, the on-site event space may include specialized hardware to accelerate the virtual sessions at the event, which may reduce the audio and video latency for on-site virtual participants. Further the client application could measure the actual latency, or request such information from the virtual conference provider, to adjust its own analysis accordingly. Considering this latency, the particular audio signature is also detected in the second audio signal within the expected or measured latency, about 0.5 seconds in this example, and the companion mode detection module 660 determines a correspondence between the first audio signal and the second audio signal. That is, the virtual session from where the second audio signal is received corresponds to the on-site event from where the first audio signal is received.

While the correspondence between the virtual event and the on-site event can be determined at the client device by the virtual conference application 650, it can also be determined by the virtual conference provider 440. For example, the virtual conference application 650 can add a timestamp at a specific time point in the audio signal captured from the microphone 632 from the on-site event and transmit the timestamped audio signal to the virtual conference provider 440. The virtual conference provider 440 can compare the timestamped audio signal to the audio signal from the virtual session around the specific time to determine if the two audio signals correspond to each other.

At block 950, the client device 410 mutes the second audio signal from the virtual event session based on the correspondence. Once the companion mode detection module 660 determines that the virtual event session corresponds to the on-site event, the virtual conference application 650 automatically switches to companion mode where the audio signals from the virtual event session is muted to avoid audio overlap between the audio from the on-site event and the audio from the corresponding virtual session. Even if the participant is wearing earbuds, turning off the audio signals from the virtual session can reduce network traffic and improve audio quality for virtual participants. Similarly, in the companion mode, the video stream is also deactivated to reduce bandwidth usage.

Figure 10:
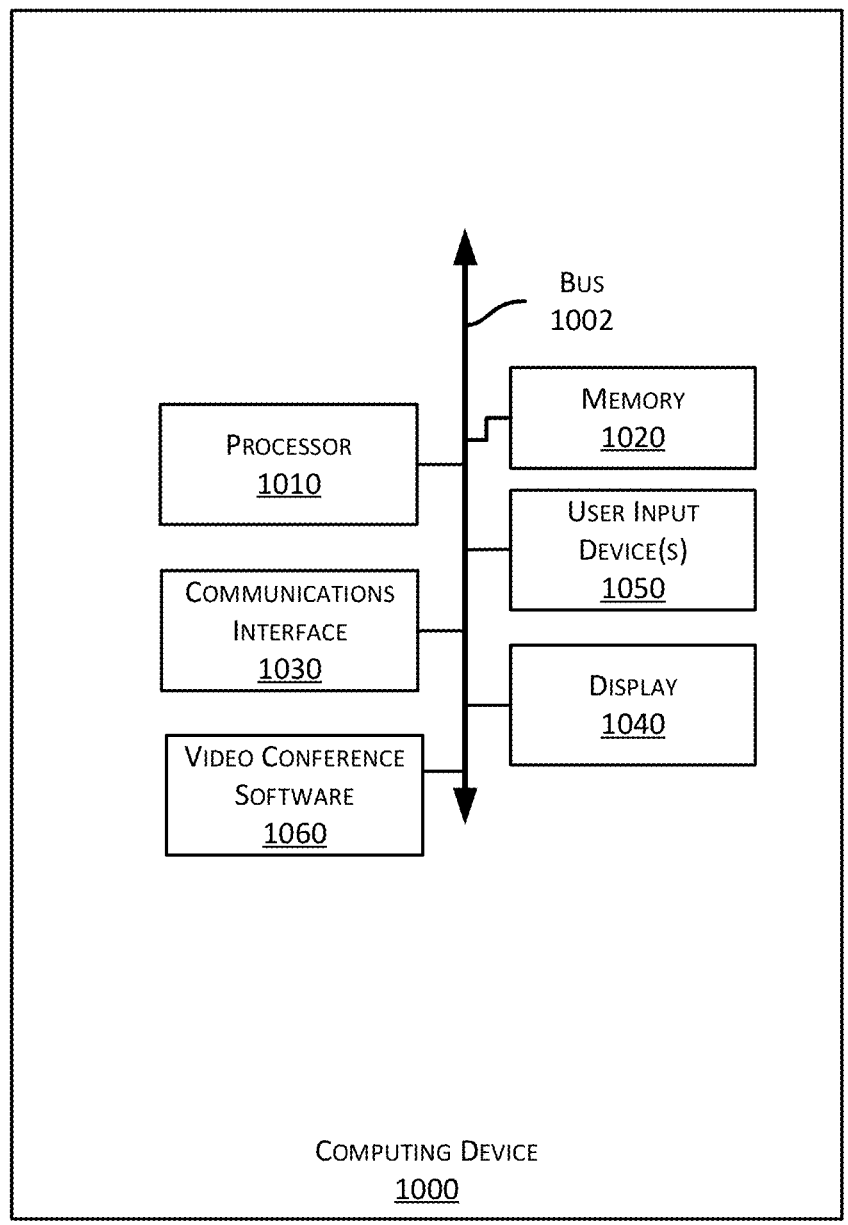
FIG. 10 shows an example computing device suitable for use with example systems and methods for automatically detecting companion mode of a virtual conference application.

Referring now to FIG. 10, FIG. 10 shows an example computing device 1000 suitable for use in example systems or methods for automatically detecting companion mode of a virtual conference application for an on-site event according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 720 to perform one or more methods for automatically detecting companion mode of a virtual conference application for an on-site event according to different examples, such as part or all of the example method 900 described above with respect to FIG. 9. In some embodiments, the computing device may include a virtual conference software 1060 for executing one or more methods described herein, such as for example, one or more steps of method 900. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes a virtual conference software 1060 to enable a user to join and participate in one or more virtual sessions or in one or more conferences, such as a conventional conference or webinar, by receiving multimedia streams from a virtual conference provider, sending multimedia streams to the virtual conference provider, interacting with other participants via chats, interacting with hosts via polls, receiving simultaneous interpretation, watching ASL translation, receiving assistive listening, such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
  joining, by a client device, a virtual event session via a virtual conference application provided by a virtual conference provider;
  receiving, by the client device during the virtual event session, a first audio signal from an audio source at an on-site event;
  receiving, by the client device during the virtual event session, a second audio signal from the virtual conference provider;
  determining, by the client device during the virtual event session, the virtual event session corresponds to the on-site event at least based on registration information of a participant of the virtual event session associated with the client device;

determining, by the client device during the virtual event session, a correspondence between the first audio signal and the second audio signal at least based on determining the virtual event session corresponds to the on-site event; and muting, by the client device during the virtual event session, the second audio signal based on the correspondence between the first audio signal and the second audio signal.

2. The method of claim 1, wherein the audio source is a speaker device at the on-site event, wherein the first audio signal is received via a microphone on the client device.

3. The method of claim 1, wherein determining the correspondence between the first audio signal and the second audio signal comprises:

extracting a particular audio signature from the first audio signal; and analyzing the second audio signal to determine if the particular audio signature is detected in the second audio signal within a predetermined period of time; and determining the correspondence between the first audio signal and the second audio signal in response to determining that the particular audio signature is detected in the second audio signal within the predetermined period of time.

4. The method of claim 3, wherein the particular audio signature comprises a particular audio pattern.

5. The method of claim 1, further comprising:

prior to joining the virtual event session via the virtual conference application, receiving one or more suggested virtual event sessions based on geolocation information of the client device.

6. The method of claim 1, further comprising:

prior to joining the virtual event session via the virtual conference application, receiving a suggestion of joining one or more virtual event sessions based on registration information of a participant for a particular conference, wherein the particular conference comprises the one or more virtual event sessions and corresponding on-site event sessions.

7. The method of claim 1, further comprising:

adding a time stamp to the first audio signal; and transmitting the first audio signal with the time stamp to the virtual conference provider, wherein the virtual conference provider is configured to compare the first audio signal with the second audio signal around the time stamp to determine the correspondence between the first audio signal and the second audio signal.

8. The method of claim 1, further comprising determining the virtual event session corresponds to the on-site event in response to determining the correspondence between the first audio signal and the second audio signal.

9. The method of claim 1, further comprising:

determining the virtual event session corresponds to the on-site event based on a location of the client device associated with the participant; and determining the correspondence between the first audio signal and the second audio signal in response to determining the virtual event session corresponds to the on-site event.

10. The method of claim 1, further comprising:

receiving an overriding signal; and unmuting the second audio signal in response to receiving the overriding signal.

11. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

join a virtual event session via a virtual conference application provided by a virtual conference provider;

receive a first audio signal from an audio source at an on-site event during the virtual event session;

receive a second audio signal from the virtual conference provider;

determine the virtual event session corresponds to the on-site event based on registration information of a participant of the virtual event session associated with the virtual conference application;

determine a correspondence between the first audio signal and the second audio signal during the virtual event session at least based on determining the virtual event session corresponds to the on-site event; and mute the second audio signal based on the correspondence between the first audio signal and the second audio signal during the virtual event session.

12. The system of claim 11, wherein the audio source is a speaker device at the on-site event, and wherein the first audio signal is received via a microphone on a client device.

13. The system of claim 11, wherein the one or more processors are configured to execute further processor-executable instructions stored in the non-transitory computer-readable medium to:

extract a particular audio signature from the first audio signal; and analyze the second audio signal to determine if the particular audio signature is detected in the second audio signal within a predetermined period of time; and determine the correspondence between the first audio signal and the second audio signal in response to determining that the particular audio signature is detected in the second audio signal within the predetermined period of time.

14. The system of claim 11, wherein the one or more processors are configured to execute further processor-executable instructions stored in the non-transitory computer-readable medium to:

prior to joining the virtual event session via the virtual conference application, receive one or more suggested virtual event sessions based on geolocation information and registration information for a particular conference, wherein the particular conference comprises one or more virtual event sessions and corresponding on-site event sessions.

15. The system of claim 11, wherein the one or more processors are configured to execute further processor-executable instructions stored in the non-transitory computer-readable medium to:

determine the virtual event session corresponds to the on-site event based on location information associated with the participant; and determine the correspondence between the first audio signal and the second audio signal in response to determining the virtual event session corresponds to the on-site event.

16. A non-transitory computer-readable medium comprising processor-executable instructions configured to cause one or more processors to:

join a virtual event session via a virtual conference application provided by a virtual conference provider;

receive a first audio signal from an audio source at an on-site event during the virtual event session;

receive a second audio signal from the virtual conference provider;

determine the virtual event session corresponds to the on-site event based on registration information of a participant of the virtual event session associated with the virtual conference application;

determine a correspondence between the first audio signal and the second audio signal during the virtual event session at least based on determining the virtual event session corresponds to the on-site event; and mute the second audio signal based on the correspondence between the first audio signal and the second audio signal during the virtual event session.

17. The non-transitory computer-readable medium of claim 16, further comprising processor-executable instructions configured to cause one or more processors to:

extract a particular audio signature from the first audio signal; and analyze the second audio signal to determine if the particular audio signature is detected in the second audio signal within a predetermined period of time; and determine the correspondence between the first audio signal and the second audio signal in response to determining that the particular audio signature is detected in the second audio signal within the predetermined period of time.

18. The non-transitory computer-readable medium of claim 16, further comprising processor-executable instructions configured to cause one or more processors to:

add a time stamp to the first audio signal; and transmit the first audio signal with the time stamp to the virtual conference provider, wherein the virtual conference provider is configured to compare the first audio signal with the second audio signal around the time stamp to determine the correspondence between the first audio signal and the second audio signal.

19. The non-transitory computer-readable medium of claim 16, further comprising processor-executable instructions configured to cause one or more processors to:

receive an overriding signal; and unmute the second audio signal in response to the overriding signal.

* * * * *